ns patent [19]

Abel et al.

[11] 3,860,540

[45] Jan. 14, 1975

[54] AGENT FOR RENDERING WOOL NON-FELTING

[75] Inventors: Heinz Abel, Reinach; Hans Hostettler, Basel; Alfred Berger, Reinach/Bl.; Rosemarie Toepfl, Basel; Arthur Maeder, Therwill, all of Switzerland

[73] Assignee: Ciba-Geigy AG, Basel, Switzerland

[22] Filed: May 17, 1972

[21] Appl. No.: 254,166

[30] Foreign Application Priority Data
May 26, 1971 Switzerland.......................... 7768/71
Sept. 6, 1971 Switzerland....................... 13100/71

[52] U.S. Cl........... 260/18 EP, 117/141, 117/139.5, 260/21, 260/29.2 N, 260/29.2 EP, 260/32.4, 260/32.6 N, 260/830 P
[51] Int. Cl...................... C08g 30/10, D06m 15/42
[58] Field of Search......... 260/404.5, 18 EP, 47 EP, 260/830 P, 29.2 EP, 29.2 N, 32.6 N, 32.4, 21; 117/139.5, 141

[56] References Cited
UNITED STATES PATENTS

| | | | |
|---|---|---|---|
| 1,970,578 | 8/1934 | Schoeller et al....................... | 260/18 |
| 3,004,056 | 10/1961 | Nunn, Jr. et al..................... | 260/461 |
| 3,563,795 | 2/1971 | Williams et al................. | 117/139.5 |
| 3,629,167 | 12/1971 | Allen et al.......................... | 260/830 |
| 3,629,226 | 12/1971 | Lohse et al......................... | 260/830 |
| 3,647,728 | 3/1972 | Deflorin et al........................ | 260/18 |
| 3,649,575 | 3/1972 | Toepfl et al. ......................... | 260/21 |
| 3,663,484 | 5/1972 | Broecker .............................. | 260/21 |
| 3,709,847 | 1/1973 | Toepfl et al. ......................... | 260/18 |
| 3,769,365 | 10/1973 | Toepfl et al. ....................... | 260/834 |

FOREIGN PATENTS OR APPLICATIONS

| | | |
|---|---|---|
| 2,054,174 | 5/1971 | Germany |
| 2,054,173 | 5/1971 | Germany |
| 2,054,171 | 5/1971 | Germany |
| 2,000,204 | 8/1970 | Germany |
| 2,127,314 | 6/1971 | Germany |

OTHER PUBLICATIONS

Epoxy Resins, by Lee et al., McGraw-Hill Book Co., 1957, p. 165–168.

Primary Examiner—Donald E. Czaja
Assistant Examiner—Eugene C. Rzucidlo
Attorney, Agent, or Firm—Joseph G. Kolodny; Edward McC. Roberts; Prabodh I. Almaula

[57] ABSTRACT

A process for rendering wool non-felting is provided wherein wool is treated at 20° to 100°C with aqueous preparations which contain a) reaction products of epoxides with at least two epoxide groups per molecule and fatty amines with basic polyamides or dicarboxylic acids and b) adducts of fatty amines with 12 to 22 carbon atoms and 6 to 30 mols of ethylene oxide, esterified with at least dibasic oxygen-containing acids.

10 Claims, No Drawings

AGENT FOR RENDERING WOOL NON-FELTING

The subject of the invention is a process for rendering wool non-felting. The process is characterised in that wool is treated, at 20° to 100°C, with aqueous preparations which contain 1) reaction products of epoxides and fatty amines with basic polyamides or dicarboxylic acids and 2) adducts of fatty amines with 12 to 22 carbon atoms and 6 to 30 mols of ethylene oxide, esterified with at least dibasic oxygen-containing acids.

Suitable reaction products of the component 1) are water-soluble or water-dispersible reaction products of epoxides, fatty amines and basic polyamides which are obtained by reacting, in an organic solvent, a reaction product of at least a) one epoxide which per molecule contains at least two epoxide groups and at least b) one higher-molecular fatty amine, the equivalent ratio of epoxide groups to amino groups being 1:0.1 to 1:0.85, with a basic polyamide which is obtained by condensation of c) polymeric, unsaturated fatty acids and c') polyalkylenepolyamines, the equivalent ratio of epoxide groups of the reaction product of the components a) and b) to amino groups of the basic polyamide from the components c) and c') being 1:1 to 1:6, preferably 1:1 to 1:5, and ensuring, through addition of acid not later than on completion of the reaction, that a sample of the reaction mixture present in the organic medium has a pH value of 2 to 8 after addition of water. The pH value is determined after adding acid to a sample of the reaction mixture present in the organic medium and diluting with water in the ratio of 1:1.

By an equivalent there is to be understood the amount of basic polyamide in grams which is equivalent to one mol of monoamine.

Further suitable materials are reaction products of epoxides, fatty amines and dicarboxylic acids which are characterised in that at least a) an epoxide which contains at least two epoxide groups per molecule, b) a higher-molecular fatty amine and c₁) an aliphatic, saturated dicarboxylic acid with at least 7 carbon atoms and optionally c₂) an anhydride of an aromatic dicarboxylic acid with at least 8 carbon atoms or of an aliphatic dicarboxylic or monocarboxylic acid with at least 4 carbon atoms, and optionally one or more of the following components: (d) an aminoplast precondensate containing alkyl-ether groups, (e) an aliphatic diol with 2 to 22 carbon atoms and (f) a polyfunctional, preferably difunctional, organic compound, which contains, as functional groups or atoms, mobile halogen, vinyl or ester groups or at most one acid, nitrile, hydroxyl or epoxide group together with at least one other functional group or an atom of the indicated type, are reacted with one another, in the presence of an organic solvent, to give a reaction product containing free carboxylic groups and the product is thereafter treated, optionally at elevated temperature, with, optionally, (g) ammonia or a water-soluble organic base, especially aliphatic tertiary monoamines or polyamines, and that, if necessary, it is ensured through adding further ammonia or further water-soluble organic bases, that a sample of the reaction mixture present in the organic medium has a $p_H$ value of 7.5 to 12 after dilution with water. The $p_H$ is determined after addition of ammonia or of further water-soluble organic bases to a sample of the reaction mixture present in the organic medium, and dilution with water in the ratio of 1:1.

The epoxides a) from which the component a) is obtained are derived from polyhydric phenols or polyphenols, such as resorcinol or phenol-formaldehyde condensation products of the type of resols or novolacs. In particular, bisphenols such as bis-(4-hydroxyphenyl)-methane and above all 2,2-bis-(4'-hydroxyphenyl)-propane are preferred as starting compounds for the manufacture of the epoxides.

Compounds to be mentioned especially here are epoxides of 2,2-bis-(4'-hydroxyphenyl)-propane which have an epoxide content of 1.8 to 5.8 epoxy group equivalents/kg, but preferably of at least 5 epoxy group equivalent/kg, and which correspond to the formula

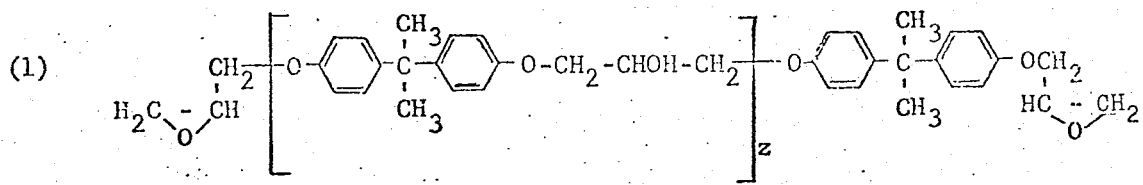

(1)

wherein z denotes an average number having a value of 0 to 0.65. Such epoxides are obtained by reaction of epichlorohydrin with 2,2-bis-(4'-hydroxyphenyl)-propane.

As component (b), mono-fatty amines with 12 to 22 carbon atoms have above all proved very suitable. As a rule these are amines of the formula $$H_3C - (CH_2)_x - NH_2 \qquad (2)$$

wherein x represents an integer having a value of 11 to 21, preferably 17 to 21. The amines are thus, for example, laurylamine, palmitylamine, stearylamine, arachidylamine or behenylamine. Mixtures of such amines, such as are obtainable as technical products, can also be used.

The ratio of epoxides a) to amines b) is so chosen that an excess of epoxide is used so that there is more than one epoxide group for each amino group. According to the invention, the amount of the components a) and b) is to be so chosen that an equivalent ratio of 1 epoxide group to 0.1–0.5 amino groups is present, that is to say the amount of epoxide which corresponds to one epoxide group equivalent is reacted with the amount of amine which corresponds to an amino group equivalent of 0.1 to 0.5. Preferably, the equivalent ratio of epoxide groups to amino groups is 1:0.1 to 1:0.5 or especially 1:0.25 to 1:0.5.

The reaction of the component a) with the component b) is appropriately carried out at 80° to 120°C, preferably 100°C.

The polymeric unsaturated fatty acids used as component c) for the manufacture of the basic polyamides are preferably aliphatic, ethylenically unsaturated dimeric to trimeric fatty acids. The reaction products are preferably manufactured from polyalkylenepolyamines c') and aliphatic unsaturated dimeric to trimeric fatty acids c) which are derived from monocarboxylic acids with 16 to 22 carbon atoms. These monocarboxylic acids are fatty acids with at least one, and preferably 2 to 5, ethylenically unsaturated bonds. Representatives of this class of acids are, for example, oleic acid, hiragonic acid, elaeostearic acid, licanic acid, arachidonic acid, clupanodonic acid and especially linoleic acid and linolenic acid. These fatty acids can be obtained from natural oils, wherein they occur primarily as glycerides.

The dimeric to trimeric fatty acids c) used according to the invention are obtained in a known manner by dimerisation of monocarboxylic acids of the indicated type. The so-called dimeric fatty acids always contain trimeric acids and a small amount of monomeric acids.

Particularly suitable components c) are dimerised and trimerised linoleic or linolenic acid. The technical products of these acids as a rule contain 75 to 95 per cent by weight of dimeric acid, 4 to 25 per cent by weight of trimeric acid and between a trace and 3% of monomeric acid. The molar ratio of dimeric to trimeric acid is accordingly about 5:1 to 36:1.

Suitable components c') are above all polyamines such as diethylenetriamine, triethylenetetramine or tetraethylenepentamine, that is to say amines of the formula

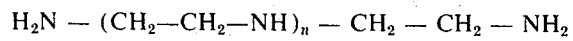

$H_2N - (CH_2-CH_2-NH)_n - CH_2 - CH_2 - NH_2$ wherein $n$ is 1, 2 or 3.

In the case of amine mixtures, n can also assume a non-integral average value, for example between 1 and 2.

As a component of particular interest, a basic polyamide from dimerised to trimerised linoleic or linolenic acid and a polyamine of the formula (3) is used.

Possible organic solvents in the presence of which the reaction of the individual components takes place are above all water-soluble organic solvents and in particular approppriately those which are miscible with water in any ratio. As examples there may be mentioned dioxane, isopropanol, ethanol and methanol, ethylene glycol n-butyl ether (=n-butylglycol) and diethylene glycol monobutyl ether.

At the same time it is, however, also possible to carry out the reaction in the presence of water-insoluble organic solvents, for example in benzine hydrocarbons such as benzine or petroleum ether, benzene or benzenes which are halogenated or substituted by lower alkyl groups, such as toluene, xylene or chlorobenzene; alicyclic compounds such as tetralin or cyclohexane; halogenated hydrocarbons such as methylene chloride, methylene bromide, chloroform, carbon tetrachloride, ethylene chloride, ethylene bromide, 3-tetrachloroethane and above all trichloroethylene or perchloroethylene.

The reaction products thus obtained are water-soluble or at least water-dispersible.

The reaction products of epoxide-fatty amine and polyamide can, if desired, also be obtained whilst conjointly using a third component w), namely a further monofunctional or bifunctional compound which differs from the first. These monofunctional or bifunctional compounds possess, as functional groups or atoms, mobile halogen atoms or vinyl, acid, ester, acid anhydride, isocyanate or epoxide groups. Appropriately, about 0.25 mol of the monofunctional compound w) are employed per one amino group equivalent of the polyamide, but this content can also be increased up to, for example, 0.5 mol per amino group equivalent. In the case of bifunctional compounds, preferably 0.05 to 0.5 mol are employed per one amino group equivalent of the polyamide.

These components w) are preferably aralkyl or alkyl halides, nitriles or amides of acids of the acrylic acid series, aliphatic or aromatic carboxylic acids, their esters or anhydrides, and also aliphatic or aromatic isocyanates, epoxides or epihalogenohydrins.

Advantageously, the following are used as monofunctional or bifunctional components w): alkyl halides such as ethyl bromide or butyl chloride, and aralkyl halides such as benzyl chloride; nitriles or amides of acrylic or methacrylic acid such as acrylonitrile or acrylamide; alkanecarboxylic acids with up to 18 carbon atoms such as coconut fatty acid or stearic acid, or their esters with alkanols which contain at most 5 carbon atoms, for example methanol, ethanol or n-butanol or their anhydrides, such as acetic anhydride; aromatic isocyanates such as phenylisocyanate; or aliphatic or aromatic epoxides such as propylene oxide, butylene oxide, dodecene oxide or styrene oxide. Epichlorohydrin is a preferred bifunctional component.

Particularly suitable components w) are alkylene oxides with at most 12 carbon atoms, alkanecarboxylic acids with at most 18 carbon atoms, monocyclic aralkyl halides or acrylonitrile.

The sequence in which the reaction of the polyamides with the monofunctional or bifunctional compounds and epoxidefatty amine reaction products takes place is of subordinate importance. It is possible first to react the polyamides with a monofunctional compound and then with the epoxide-fatty amine reaction product, or vice versa. In some cases, if there are no great differences in the reactivity, the reaction can also be effected simultaneously.

The reaction to give the reaction product of the components a) and b) with c) and c') is now carried out in such a way that water-soluble of water-dispersible polyaddition products are produced, by adjusting the pH value, not later than on completion of the reaction, to 2-8, preferably to 2-7, but especially to 5-6. To establish this pH value, inorganic or organic acids are for example used, advantageously easilyvolatile organic acids such as formic acid or acetic acid. It is advisable, immediately after, or shortly after, starting to combine the basic polyamide with the epoxide, to add a certain amount of acid to the reaction mixture and also to add further acid continuously or in portions during the further reaction. Furthermore, the process is preferably carried out at temperatures of up to 80°C, that is to say, for example, from 25° to 80°C, especially 45° to 70°C. The solutions or dispersions thus obtained, which have been adjusted to the pH value mentioned by means of acid and which have appropriately been adjusted to a content of 10 to 30% of reaction product by means of an organic solvent or preferably by means of water - in most cases, slightly opalescent to cloudy solutions are concerned - are distinguished by high stability.

Products with advantageous properties are also obtained if after the addition of the acid and of the water the preparation is further stored at room temperature or elevated temperature, for example for 4 hours at 70°C or for a longer period at a lower temperature.

Alkylenedicarboxylic acids with 7 to 14 carbon atoms have above all proved advantageous components $(c_1)$. As a rule these are dicarboxylic acids of the formula $HOOC - (CH_2)_y - COOH$

wherein $y$ denotes an integer having a value of 5 to 12, preferably of 6 to 10.

Possible components ($c_1$) are accordingly, for example, dicarboxylic acids such as pimelic, suberic, azelaic or sebacic acid, nonanedicarboxylic, decanedicarboxylic, undecanedicarboxylic or dodecanedicarboxylic acid.

The component ($c_1$) can be employed by itself or together with the component ($c_2$). Preferably, an anhydride of a monocyclic or bicyclic aromatic dicarboxylic acid with 8 to 12 carbon atoms or of an aliphatic dicarboxylic acid with 4 to 10 carbon atoms is used as the component ($c_2$). Anhydrides of a monocyclic aromatic dicarboxylic acid with 8 to 10 carbon atoms have proved particularly advantageous. Optionally methyl-substituted phthalic anhydride is of particular interest.

Possible components ($c_2$) are accordingly anhydrides such as, for example, maleic anhydride or phthalic anhydride.

If the component (d) is also used for the manufacture of the reaction products, its proportion, relative to the total of the components (a), (b), ($c_1$) and (d) is 10 to 50, especially 20 to 25, per cent by weight.

The aminoplast precondensates which serve as component (d) are completely, or especially partially, etherified methylol compounds of nitrogen-containing aminoplast-forming substances, such as urea and urea derivatives, for example ethyleneurea, propylene urea or glyoxalmonourein.

Preferably, however, etherified methylolaminotriazines are used, such as, for example, alkyl ethers of highly methylolated melamine, of which the alkyl radicals contain 1 to 4 carbon atoms. Possible alkyl radicals are, inter alia, methyl, ethyl, n-propyl, isopropyl, n-butyl and also n-hexyl radicals. In addition to such alkyl radicals, further radicals, for example polyglycol radicals, can also be present in the molecule. n-Butyl ethers of a highly methylolated melamine, which contain 2 to 3 n-butyl groups per molecule, are furthermore preferred. By highly methylolated melamines there are here to be understood those with an average of at least 5, appropriately about 5.5, methylol groups.

Where the component (e) is used conjointly for the manufacture of the reaction products, these diols are preferably aliphatic diols with 2 to 6 carbon atoms of which the carbon chains can optionally be interrupted by oxygen atoms. Alkylenediols with 2 to 6 carbon atoms or diethylene glycol or triethylene glycol are here of particular interest. Amongst the alkylenediols with 2 to 6 carbon atoms which are used with particular advantage there may be mentioned, for example, ethylene glycol, 1,4-butanediol or above all 1,6-hexanediol.

The optional, polyfunctional, preferably bifunctional, component (f) preferably contains, as functional groups or atoms, halogen atoms, vinyl groups or carboxylic acid ester groups bonded to an alkyl radical, or at most one epoxide, carboxylic acid or hydroxyl group together with another functional group or another atom of the indicated type. In particular, the compounds are bifunctional organic compounds which contain, as functional groups or atoms, chlorine or bromine atoms, vinyl or carboxylic acid alkyl ester groups bonded to an alkyl radical, or at most one epoxide or carboxylic acid group together with another functional group or another atom of the indicated type.

Particularly suitable bifunctional organic compounds are aliphatic. They are, for example, epihalogenohydrins such as epibromohydrin or above all epichlorohydrin.

Other possible bifunctional compounds are, for example, glycerine dichlorohydrin, acrylic acid, methylolacrylamide and acrylonitrile.

The component (g) is appropriately an aliphatic tertiary monoamine, ammonia or an amine containing at least two amino groups and exclusively containing basic nitrogen atoms, in which the amino groups possess at least one hydrogen atom bonded to nitrogen.

Preferred tertiary amines are trialkylamines with 3 to 12 carbon atoms, for example triethylamine, tri-n-propylamine or tri-n-butylamine.

The diamines to be used as component (g) can be aliphatic or cycloaliphatic and preferably at least one primary amino group and a second amino group wherein at least one hydrogen atom is bonded to nitrogen. Furthermore, ammonia can also simply be employed as component (g). However, di-primary aliphatic or cycloaliphatic amines are preferably used as component (g).

Suitable aliphatic amines are here above all polyamines, such as diethylenetriamine, triethylenetetramine or tetraethylenepentamine, that is to say amines of the formula

$$H_2N-(CH_2-CH_2-NH)_n-CH_2-CH_2-NH_2$$

wherein $n$ is 1, 2 or 3.

In the case of amine mixtures, $n$ can also assume a non-integral average value, for example between 1 and 2.

Suitable cycloaliphatic amines are above all diprimary, cycloaliphatic diamines which apart from the two amine nitrogen atoms only contain carbon and hydrogen and which possess a saturated 5-membered to 6-membered carbocyclic ring, a $H_2N$ group bonded to a ring carbon atom and a $H_2N-CH_2-$ group bonded to another ring carbon atom.

3,5,5-Trimethyl-1-amino-3-aminomethyl-cyclohexane or 1-amino-2-amino-methyl-cyclopentane may be mentioned as examples of such amines.

The reaction products can be manufactured in accordance with methods which are in themselves known, and the components can be reacted with one another in various sequences. Appropriately, components (a) and (b), or (a), (b) and ($c_1$), are first reacted with one another. The reaction of the component ($c_1$) with the components (a) and (b) which have already been reacted can also be carried out simultaneously with the components (e). The reaction with the components (d) and/or (f) is as a rule only carried out at the end, that is to say before addition of the component (g).

On the one hand it is thus possible first to react the components (a), (b) and ($c_1$) and optionally ($c_2$) simultaneously with one another and subsequently optionally to react the product with the components (d), (e) and (f). In this process variant, the components (a), (b) and ($c_1$) are appropriately reacted with one another at temperatures of 80° to 120°C, preferably 100°C, the quantity ratios being advantageously so chosen that at an epoxide group equivalent of 1 the equivalent ratio of amino groups to carboxylic acid groups is 0.1:1 to 0.5:0.55.

On the other hand, it is also possible first to react the components (a) and (b) alone with one another and subsequently to react the products with the component ($c_1$) and optionally in a third stage with the components (d), (e) or (f). The manufacture of the reaction products from (a) and (b), according to this 2nd variant, is appropriately also carried out at temperatures of 80° to 120°C, preferably at about 100°C. The reaction in the second stage, with the component ($c_1$), is appropriately carried out at 80° to 110°C, preferably about 100°C, the quantity ratios being advantageously so chosen that at an expoxide group equivalent of 1 the equivalent ratio of amino groups to carboxylic acid groups is 0.1:1 to 0.5:0.55.

According to the invention, the ratio of epoxide (a) to fatty amine (b) and acid ($c_1$) or anhydride ($c_2$) is so chosen that a deficiency of epoxide is used, so that there is less than one epoxide group relative to the sum of the amino groups and acid groups. The reaction products thus contain carboxylic end groups.

The reaction product containing carboxylic acid groups as a rule has an acid number of 20 to 80, preferably 35 to 60.

The reaction with the component (d) is as a rule carried out at temperatures of 60° to 105°C, preferably about 100°C. In most cases, this reaction is carried out in the presence of small amounts of organic solvents, such as, for example, n-butanol.

As already mentioned, the reaction with the component (e) is carried out simultaneously with the component ($c_1$).

The reaction with the component (f) is carried out before adding the component (g), at temperatures of about 60° to 120°C.

The component (g) can be added at room temperature or elevated temperature, so that either only a neutralisation with salt formation takes place or, unless tertiary amines are used, a true reaction takes place. In both cases, however, watersoluble or dispersible polyaddition products are produced in that, not later than after completion of the reaction, it is ensured, if necessary through addition of a base, that a sample of the reaction mixture diluted with water has a pH value of 7.5 to 12, preferably of 8 to 10. For this, inorganic or organic bases, advantageously easily volatile bases such as ammonia, are, for example, used. It is furthermore advantageous to use temperatures of at most 80°C, for example 60° to 70°C, in a reaction with (g). When using ammonia or a tertiary amine as component (g), the reaction is appropriately carried out at room temperature. The solutions or dispersions thus obtained, to which base has been added if necessary and which have appropriately been adjusted to a content of 10 to 40% of reaction product by means of an organic solvent or by means of water, are distinguished by high stability.

Possible organic solvents in the presence of which the reaction products are manufactured are above all water-soluble organic solvents, and appropriately those which are miscible with water in all proportions. As examples there may be mentioned dioxane, isopropanol, ethanol and methanol, ethylene glycol n-butyl ether (=n-butylglycol and diethylene glycol monobutyl ether.

At the same tiime it is, however, also possible to carry out the reaction in the presence of water-insoluble organic solvents, for example in hydrocarbons such as benzine, benzene, toluene and xylene; halogenated hydrocarbons such as methylene chloride, methylene bromide, chloroform, carbon tetrachloride ethylene chloride, ethylene bromide, s-tetrachloroethane and above all trichloroethylene.

The esterified fatty amine-ethylene oxide adducts used as component (2) are derived from fatty amines which contain aliphatic hydrocarbon radicals with 12 to 22 carbon atoms, preferably 16 to 18 carbon atoms. The aliphatic hydrocarbon radicals can be saturated or unsaturated, branched or, preferably, unbranched.

Possible base materials are single higher-molecular alkylamines or mixtures such as are obtained on converting natural fatty acid mixtures, for example tallow fatty acid, into the corresponding amines. As amines, there may in detail be mentioned dodecylamine, hexadecylamine, stearylamine, octadecylamine, arachidylamine [$H_3C-(CH_2)_{19}-NH_2$], behenylamine [$H_3C-(CH_2)_{21}-NH_2$] and octadecenylamine.

The reaction of these amines with ethylene oxide yields, in a known manner, polyglycol compounds of the formula

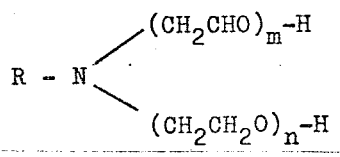

wherein R denotes an aliphatic, preferably unbranched, hydrocarbon radical with 12 to 22 carbon atoms and the sum ($m + n$) denotes an integer having a value of 6 to 30, preferably 7 to 16.

The esterification is appropriately carried out with functional derivatives of at least dibasic oxygen-containing acids under such conditions that at least one acid ester group is introduced, preferably in the form of an alkali salt, ammonium salt or amine salt. As polybasic organic acids for the formation of the acid esters it is possible to use organic polycarboxylic acids or carboxylic acid-sulphonic acids, for example maleic acid or succino-sulphonic acid, or polybasic inorganic oxygen-containing acids, such as phorphoric acid or preferably sulphuric acid, or functional derivatives of these acids, such as anhydrides, halides or amides. The acid sulphuric acid esters are advantageously directly manufactured in the form of their ammonium salts by heating the starting substances with aminosulphonic acid in the presence of urea. Thereafter, dilute aqueous solutions of the esters are appropriately produced.

The combination of the reaction products can be employed for various purposes, above all for textile finishing. They are suitable, in particular, for rendering wool non-felting by impregnating the wool with an aqueous liquor to which the preparation and, if desired small amounts of yet further additives, such as wetting agents and dispersing agents and salts have been added, then drying it and subjecting it to a treatment at elevated temperature. However, the process for dyeing wool and rendering it non-felting, in which, successively and in optional sequence, the wool is on the one hand dyed by the exhaustion method and is on the other hand treated, at temperatures of 20° to 100°C and a pH value of 7 to 2, or 7 to 9, with the preparations according to the invention, if they contain anionic or cationic reaction products, proves to be particularly advantageous. Dyeing and the non-felting treatment can thereby be combined in a simple manner and carried out in the same apparatus without taking the wool out of the apparatus between the two processes.

Dyeing can here be carried out in the customary manner which is in itself known, using any desired dyestuffs which can be used for wool, for example acid wool dyestuffs, 1:1 or 1:2 metal complex dyestuffs or reactive dyestuffs. Equally, the additives which are customary when dyeing wool can be used, such as sulphuric acid, acetic acid, sodium sulphate, ammonium sulphate and levelling agents, possible levelling agents above all being polyglycol compounds of higher aliphatic amines, which can optionally also be quaternised and/or esterified at the hydroxyl groups by means of polybasic acids.

The amount of the reaction product (not including solvent and water), relative to the weight of wool, is appropriately 0.5 to 5%, preferably 1.2 to 4%. The amounts of the amine-ethylene oxide adduct are 0.01 to 2% relative to the weight of the wool. As has been mentioned, the process is carried out at temperatures of 20° to 100°C, preferably 35° to 100°C, and in doing so between 5 and 60 minutes is in most cases required for extensive to practically complete fixing of the polyaddition product.

The sequence of the two processes is optional but in general it tends to be advantageous to carry out dyeing first and the non-felting treatment afterwards.

The combined process for dyeing wool and rendering it non-felting is particularly suitable for true machine dyeing, where the goods being dyed are static and the liquor is agitated.

The liquor used for the non-felting treatment also contains, in addition to the preparation of the polyaddition product and of the esterified amino-ethylene oxide adduct, the amount of acid or base required for adjusting the $p_H$ value, for example sulphuric acid, hydrochloric acid, oxalic acid or, especially acetic acid, or ammonia and sodium bicarbonate. Further more, however, other salts such as sodium sulphite or sodium thiosulphate can also be used. The liquors can, however, furthermore contain other customary additives such as agents for imparting a soft handle or bleaching agents, for example hydrogen peroxide.

Suitable agents for imparting a soft handle are, for example, oil, fat and wax emulsions, fatty acid condensation products or polyethylene, siloxane and silicone emulsions. Mixtures of the said agents for imparting a soft handle can also be employed, if desired.

The agents for imparting a soft handle are preferably added in the emulsified form to the liquors containing the agents for imparting non-felting properties, but can also be introduced into the exhausted or largely exhausted liquors and be applied in the form of an aftertreatment. The emulsions for imparting a soft handle contain about 10 to 30 per cent by weight of active substance. The amount applied in the case of a 20% strength emulsion is about 0.5 to 4 per cent by weight relative to the weight of the wool.

Suitable mixtures for imparting a soft handle contain, for example, 50 to 80 parts by weight of a polyethylene (containing carboxyl groups introduced by oxidation) and 20 to 50 parts by weight of a condensation product of dimerised unsaturated fatty acids and diethylenetriamine of 50 to 80 parts by weight of the said polyethylene, 10 to 30 parts by weight of paraffin and 10 to 20 parts by weight of the said condensation product.

If desired, small amounts of silicone oil can also be mixed in. In addition to the improved soft handle of the substrates, the agents for imparting a soft handle also give an additional improvement of the non-felting effect.

If desired, the permanence of the non-felting finishes can be improved if the wool is pre-treated with a dilute aqueous solution of dichloroisocyanuric acid or its alkali metal salt before the treatment with a preparation which contains a reaction product.

When using treatment baths with a high content of organic, above all water-insoluble, solvents, or even anhydrous baths containing only organic solvents, the process is appropriately carried out in closed equipment, for example such equipment as is used in chemical dry cleaning.

When using the preparations in combination with an aminoplast on textiles, especially on cotton, a wash-resistant "soil release" effect is achieved. Using the preparations it is also possible to impart a non-iron finish to textiles.

The preparations can furthermore be employed as a size for paper.

Furthermore, the use of preparations which contain the reaction products leads to good fixing of dyestuffs, especially reactive dyestuffs, on textiles, especially wool, which expresses itself, inter alia, in an improved fastness to perspiration.

Furthermore, finishes using the present reaction product also improve the mechanical properties, for example tear strength, elongation at break, abrasion resistance and tendency to pilling of the treated textile material. The wool material to be treated can, using the present process, be rendered non-felting in any desired states of processing, for example as a yarn, tops or fabric.

The present process eliminates the existing difficulty that some agents for imparting non-felting properties are not absorbed, or only inadequately absorbed, on the substrates. The use of an ester of an amine-ethylene oxide adduct permits non-felting finishing with anionic or cationic agents for imparting non-felting properties from aqueous liquors, both when using hard water and when using deionised water in the manufacture of the application liquors.

In the examples which follow, percentages are percentages by weight.

EXAMPLE 1

98 g of an epoxide formed from 2,2-bis-(4'-hydroxyphenyl)-propane and epichlorohydrin (0.5 epoxide group equivalent) together with 54.2 g of a mixture of 1-amino-eicosane and 1-amino-docosane (0.175 amino group equivalent) and 47 g of azelaic acid (0.5 acid group equivalent) are stirred for 2 hours at 100°C internal temperature in a nitrogen atmosphere. An 80% strength solution of 54.2 g of hexamethylolmelamine dibutyl and tributyl ether (that is to say a mixture of di- and tri-n-butyl ethers of a highly methylolated melamine) in n-butanol is then added and the mixture is again stirred for 1 hour at 100°C. Dilution with 240 g of ethylene glycol monobutyl ether yields a 50% strength product of medium viscosity, having an acid number of 46.4.

121 g of the 50% strength product described (0.05 acid group equivalent) together with 12.2 g of triethylenetetramine (0.5 amino group equivalent) are warmed for 1 hour at 60°C internal temperature. After dilution with 225 g of ethylene glycol monobutyl ether a clear solution is obtained. The preparation can be diluted with water and has a pH value of 9.7.

EXAMPLE 2

98 g (0.5 epoxide group equivalent) of the epoxide described in Example 1 together with 54.2 g (0.175 amino group equivalent) of a mixture of 1-amino-eicosane and 1-amino-docosane and 60.6 g (0.6 acid group equivalent) of sebacic acid are stirred for 2 hours at 100°C internal temperature in a nitrogen atmosphere. An 80% strength solution of 54.2 g of hexamethylolmelamine di- and tri-n-butyl ether in n-butanol is then added and the mixture is again stirred for 1 hour at 100°C. Dilution with 253 g of ethylene glycol monobutyl ether yields a 50% strength product of medium viscosity, having an acid number of 58.4.

192 g of the 50% strength product described (0.1 acid group equivalent) together with 24.4 g of triethylenetetramine (1.0 amino group equivalent) are stirred for 1 hour at 60°C internal temperature.

After dilution with 371.6 g of ethylene glycol monobutyl ether and adding 9 g of 24% strength ammonia, a clear solution which is miscible with water in all proportions is obtained. The pH value is 9.8.

EXAMPLE 3

98 g (0.5 epoxide group equivalent) of the epoxide described in Example 1 together with 54.2 g (0.175 amino group equivalent) of a mixture of 1-aminoeicosane and 1-amino-docosane and 50.5 g (0.5 acid group equivalent) of sebacic acid are stirred for 5 hours at 100°C internal temperature in a nitrogen atmosphere. An 80% strength solution of 54.2 g of hexamethylolmelamine di- and tri-butyl ether in butanol is then added and the mixture is again stirred for 1 hour at 100°C. Dilution with 243 g of ethylene glycol monobutyl ether yields a 50% strength product of medium viscosity, having an acid number of 45.

124.2 g of the 50% strength product described (0.05 acid group equivalent) together with 12.2 g of triethylenetetramine (0.5 amino group equivalent) are stirred for 1 hour at 60°C internal temperature. After dilution with 226 g of ethylene glycol monobutyl ether a clear solution which is infinitely miscible with water is obtained. The pH value is 9.5.

EXAMPLE 4

98 g (0.5 epoxide group equivalent) of the epoxide described in Example 1 together with 54.2 g (0.175 amino group equivalent) of a mixture of 1-aminoeicosane and 1-amino-docosane and 45.4 g (0.45 acid group equivalent) of sebacic acid are stirred for 2 hours at 100°C internal temperature in a nitrogen atmosphere. An 80% strength solution of 54.2 g of hexamethylolmelamine di- and tri-butyl ether in butanol is then added and the mixture is again stirred for 1 hour at 100°C. Dilution with 238 g of ethylene glycol monobutyl ether yields a 50% strength product of medium viscosity having an acid number of 41.3.

135.5 g of the 50% strength product described (0.05 acid group equivalent) together with 12.2 g of triethylenetetramine (0.5 amino group equivalent) are stirred for 1 hour at 60°C internal temperature. After dilution with 242 g of ethylene glycol monobutyl ether and adding 6.4 g of 24% strength ammonia, a clear solution which is miscible with water in all proportions is obtained. The pH value is 9.9.

EXAMPLE 5

98 g (0.5 epoxide group equivalent) of the epoxide described in Example 1 together with 54.2 g (0.175 amino group equivalent) of a mixture of 1-aminoeicosane and 1-amino-docosane and 50.5 g (0.5 acid group equivalent) of sebacic acid are stirred for 2 hours at 100°C internal temperature in a nitrogen atmosphere. After dilution with 202.7 g of ethylene glycol monobutyl ether a 50% strength product of medium viscosity having an acid number of 57.8 is obtained.

145.5 g of the 50% strength product described (0.075 acid group equivalent) together with 18.3 g of triethylenetetramine (0.75 amino group equivalent) are stirred for 1 hour at 60°C internal temperature. After dilution with 281 g of ethylene glycol monobutyl ether a clear solution which is inifinitely miscible with water is obtained. The pH value is 10.1.

EXAMPLE 6

98 g (0.5 epoxide group equivalent) of the epoxide described in Example 1 together with 31 g of a mixture of 1-amino-eicosane and 1-amino-docosane (0.1 amino group equivalent) and 50 g of n-butylglycol are stirred for 3 hours at 100°C. 40.1 g of pimelic acid (0.5 acid group equivalent) are then added and the mixture is again stirred for 3 hours at 100°C internal temperature. It is then diluted with 119 g of n-butyl glycol and further stirred until cold. A clear product of medium viscosity having an acid number of 70 is obtained.

150 g of the 50% strength product described are treated with 25 g of triethylamine and 12 g of n-butylglycol. A clear solution of 40% solids content is obtained. A sample of this solution is diluted with deionised water (1:20); the pH value of this sample is 10.5.

An analogous procedure is followed with the products which are manufactured according to Examples 7 to 24, 26 and 27 and 29 to 35 below.

EXAMPLE 7

98 g (0.5 epoxide group equivalent) of the epoxide according to Example 1 together with 31 g (0.1 amino group equivalent) of a mixture of 1-amino-eicosane and 1-amino-docosane and 50 g of butyl glycol are stirred for 3 hours at 100°C internal temperature. 58.6 g of dodecanedicarboxylic acid (0.5 acid group equivalent) are then added and the mixture is again stirred for 3 hours at 100°C internal temperature. After dilution with 137 g of n-butylglycol a clear product of medium viscosity having an acid number of 65.5 is obtained.

EXAMPLE 8

98 g (0.5 epoxide group equivalent) of the epoxide according to Example 1 together with 31 g (0.1 amino group equivalent) of a mixture of 1-amino-eicosane and 1-amino-docosane and 50 g of butyl glycol are stirred for 3 hours at 100°C internal temperature. 14.75 g of 1,6-hexanediol (0.25 hydroxyl group equivalent) and 50.5 g of sebacic acid (0.5 acid group equivalent) are then added and the mixture is again stirred for 3 hours at 100°C internal temperature. It is then diluted with 144 g of n-butylglycol and further stirred until cold. A clear product of medium viscosity having an acid number of 63 is obtained.

EXAMPLE 9

98 g (0.5 epoxide group equivalent) of the epoxide according to Example 1 together with 54.2 g (0.175 amino group equivalent) of a mixture of 1-amino-eicosane and 1-amino-docosane and 50 g of n-butylglycol are stirred for 5 hours at 100°C internal temperature. 60.6 g of sebacic acid (0.6 acid group equivalent) are then added and the mixture is stirred for a further 5 hours at 100°C internal temperature. After addition of 16.2 g of epichlorohydrin (0.175 mol) the whole is again stirred for 5 hours at 100°C internal temperature. It is then diluted with 179 g of n-butylglycol and further stirred until cold. A clear product of medium viscosity having an acid number of 64 is obtained.

EXAMPLE 10

98 g (0.5 epoxide group equivalent) of the epoxide according to Example 1 together with 31 g (0.1 amino group equivalent) of a mixture of 1-amino-eicosane and 1-amino-docosane and 50 g of butylglycol are stirred for 5 hours at 100°C internal temperature. 50.5 g of sebacic acid (0.5 acid group equivalent) and 7.4 g of phthalic anhydride (0.1 acid group equivalent) are then added and the mixture is again stirred for 5 hours at 100°C internal temperature. 9.25 g of epichlorohydrin (0.1 mol) are now added and the whole is stirred for a further 5 hours at 100°C. It is then diluted with 146 g of n-butylglycol and further stirred until cold. A clear mobile product of acid number 67 is obtained.

EXAMPLE 11

98 g (0.5 epoxide group equivalent) of an epoxide according to Example 1 together with 31 g (0.1 amino group equivalent) of a mixture of 1-amino-eicosane and 1-amino-docosane and 50 g of butylglycol are stirred for 3 hours at 100°C internal temperature. 11.7 g of 1,6-hexanediol (0.3 hydroxyl group equivalent) and 50.5 g of sebacic acid (0.5 acid group equivalent) are then added and the mixture is again stirred for 3 hours at 100°C internal temperature. After adding 4.6 g of epichlorohydrin (0.05 mol) the whole is then stirred for a further 3 hours at 100°C internal temperature and is subsequently diluted with 151.8 g of n-butylglycol and further stirred until cold. A clear mobile product of acid number 43.6 is obtained.

EXAMPLE 12

98 g (0.5 epoxide group equivalent) of the epoxide described in Example 1 together with 31 g of a mixture of 1-amino-eicosane and 1-amino-docosane (0.1 amino group equivalent) and 50 g of n-butylglycol are stirred for 3 hours at 100°C internal temperature. 50.5 g of sebacic acid (0.5 acid group equivalent) and 9.8 g of maleic anhydride (0.2 acid group equivalent) are then added and the mixture is again stirred for 3 hours at 100°C internal temperature. Thereafter 9.25 g of epichlorohydrin (0.1 mol) are also added and the whole is again stirred for 3 hours at 100°C internal temperature. After adding 148.5 g of n-butylglycol it is stirred until cold. A clear product of medium viscosity and of acid number 60.3 is obtained.

EXAMPLE 13

98 g (0.5 epoxide group equivalent) of the epoxide described in Example 1 together with 31 g of a mixture of 1-amino-eicosane and 1-amino-docosane (0.1 amino group equivalent) and 50 g of n-butylglycol are stirred for 3 hours at 100°C internal temperature. 14.75 g of 1,6-hexanediol (0.25 hydroxyl group equivalent) and 50.5 g of sebacic acid (0.5 acid group equivalent) are then added and the mixture is again stirred for 3 hours at 100°C internal temperature. After cooling to 60°C internal temperature, 6.5 g of glycerine dichlorohydrin (0.05 mol) are added and the whole is stirred for 3 hours at 60°C internal temperature. 150.7 g of n-butylglycol are then added and the mixture is further stirred until cold. A clear product of medium viscosity and of acid number 61.5 is obtained.

EXAMPLE 14

98 g (0.5 epoxide group equivalent) of the epoxide described in Example 1 together with 31 g of a mixture of 1-amino-eicosane and 1-amino-docosane (0.1 amino group equivalent) and 50 g of n-butylglycol are stirred for 3 hours at 100°C internal temperature. 44.5 g of polypropylene glycol (0.1 mol) and 50.5 g of sebacic acid (0.5 acid group equivalent) are then added and the mixture is again stirred for 3 hours at 100°C internal temperature. After adding 9.25 g of epichlorohydrin (0.1 mol) the whole is stirred for a further 3 hours at 100°C internal temperature and 183.25 g of n-butylglycol are then added. A clear product of medium viscosity and of acid number 31 is obtained.

EXAMPLE 15

98 g (0.5 epoxide group equivalent) of the epoxide described in Example 1 together with 18.6 g of laurylamine (0.1 amino group equivalent) and 45 g of n-butylglycol are stirred for 3 hours at 100°C internal temperature. 50.5 g of sebacic acid (0.5 acid group equivalent) are then added and the mixture is again stirred for 3 hours at 100°C internal temperature. Thereafter 5.3 g of acrylonitrile (0.1 mol) are added and the whole is stirred for a further 3 hours at 100°C internal temperature. After adding 127 g of n-butylglycol it is further stirred until cold and a clear product of medium viscosity and of acid number 65.8 is obtained.

EXAMPLE 16

98 g (0.5 epoxide group equivalent) of the epoxide described in Example 1 together with 27 g of stearylamine (0.1 amino group equivalent) and 50 g of n-butylglycol are stirred for 3 hours at 100°C internal temperature. 50.5 g of sebacic acid (0.5 acid group equivalent) are then added and the mixture is again stirred for 3 hours at 100°C internal temperature. Thereafter, 10.2 g of acetic anhydride (0.1 mol) are added and the whole is stirred for a further 3 hours at 100°C internal temperature. After adding 135 g of n-butylglycol it is further stirred until cold and a clear product of medium viscosity and of acid number 91.7 is obtained.

EXAMPLE 17

98 g (0.5 epoxide group equivalent) of the epoxide described in Example 1 together with 54.2 g of a mixture of 1-amino-eicosane and 1-amino-docosane (0.175 amino group equivalent) and 47 g of azelaic acid (0.5 acid group equivalent) are warmed for 2 hours to 100°C internal temperature. An 80% strength solution of 54.2 g of hexamethylolmelamine dibutyl and tributyl ether in n-butanol is then added and the mixture is again stirred for 1 hour at 100°C internal temperature. Dilution with 240 g of n-butylglycol yields

EXAMPLE 18

98 g (0.5 epoxide group equivalent) of the epoxide described in Example 1 together with 31 g of a mixture of 1-amino-eicosane and 1-amino-docosane (0.1 amino group equivalent) and 50 g of n-butylglycol are stirred for 2 hours at 100°C internal temperature. 50.5 g of sebacic acid (0.5 acid group equivalent) are then added and the mixture is again stirred for 2 hours at 100°C internal temperature. After adding 12.4 g of ethylene glycol (0.4 hydroxyl group equivalent) the whole is stirred for a further 2 hours at 100°C internal temperature. An 80% strength solution of 54.2 g of hexamethylolmelamine dibutyl and tributyl ether in n-butanol is then added and the mixture is stirred for 2 hours at 100°C internal temperature. After dilution with 182 g of n-butylglycol, a clear product of medium viscosity and of acid number 42.9 is obtained.

EXAMPLE 19

98 g (0.5 epoxide group equivalent) of the epoxide described in Example 1 together with 46.5 g of a mixture of 1-amino-eicosane and 1-amino-docosane (0.15 amino group equivalent) and 50 g of n-butylglycol are warmed for 3 hours at 100°C internal temperature. 60.6 g of sebacic acid (0.6 acid group equivalent) are then added and the mixture is stirred for 3 hours at 110°C internal temperature. After adding 13.9 g of epichlorohydrin (0.15 mol) the whole is again stirred for 3 hours at 100°C internal temperature. After dilution with 225 g of n-butylglycol, the reaction product is cooled to 70°C internal temperature and an 80% strength solution of 93.5 g of hexamethylolmelamine dibutyl and tributyl ether is added and the mixture is again stirred for 30 minutes at 70°C internal temperature.

It is thereafter cooled to room temperature.

EXAMPLE 20

98 g (0.5 epoxide group equivalent) of the epoxide described in Example 1 together with 31 g of a mixture of 1-amino-eicosane and 1-amino-docosane (0.1 amino group equivalent) and 50 g of n-butylglycol are stirred for 3 hours at 100°C internal temperature. Thereafter 17.7 g of 1,6-hexanediol (0.3 hydroxyl group equivalent) and 50.5 g of sebacic acid (0.5 acid group equivalent) are added and the mixture is again stirred for 3 hours at 100°C internal temperature. After adding 4.6 g of epichlorohydrin (0.05 mol) the whole is stirred for a further 3 hours at 100°C internal temperature. After dilution with 207.9 g of n-butylglycol the product is cooled to 70°C internal temperature and an 80% strength solution of 93.5 g of hexamethylolmelamine dibutyl and tributyl ether in n-butanol is added, and the mixture is again stirred for 30 minutes at 70°C internal temperature. Thereafter it is cooled to room temperature.

EXAMPLE 21

98 g (0.5 epoxide group equivalent) of the epoxide described in Example 1 together with 31 g (0.1 amino group equivalent) of a mixture of 1-amino-eicosane and 1-amino-docosane and 50 g of n-butylglycol are stirred for 3 hours at 100°C internal temperature. Thereafter 9.3 g of 1,2-propylene glycol (0.25 hydroxyl group equivalent), 40.4 g of sebacic acid (0.4 acid group equivalent) and 7.4 g of phthalic anhydride (0.1 acid group equivalent) are added and the mixture is again stirred for 3 hours at 100°C internal temperature. It is subsequently diluted with 136 g of n-butylglycol and further stirred until cold. A clear product of medium viscosity and of acid number 57 is obtained.

EXAMPLE 22

98 g (0.5 epoxide group equivalent) of the epoxide described in Example 1 together with 31 g (0.1 amino group equivalent) of a mixture of 1-amino-eicosane and 1-amino-docosane and 50 g of n-butylglycol are stirred for 3 hours at 100°C internal temperature. 11.25 g of 1,4-butanediol (0.25 hydroxyl group equivalent), 50.5 g of sebacic acid (0.5 acid group equivalent) and 7.4 g of phthalic anhydride (0.1 acid group equivalent) are then added and the mixture is stirred for a further 3 hours at 100°C internal temperature. After adding 9.25 g of epichlorohydrin (0.1 mol) the whole is again stirred for 3 hours at 100°C internal temperature. After dilution with 157 g of n-butylglycol it is further stirred until cold. A clear product of medium viscosity and of acid number 43.6 is obtained.

EXAMPLE 23

98 g (0.5 epoxide group equivalent) of the epoxide described in Example 1 together with 31 g (0.1 amino group equivalent) of a mixture of 1-amino-eicosane and 1-amino-docosane and 50 g of n-butylglycol are stirred for 3 hours at 100°C internal temperature. Thereafter 22.5 g (0.3 hydroxyl group equivalent) of triethylene glycol and 50.5 g (0.5 acid group equivalent) of sebacic acid are added and the mixture is again stirred for 3 hours at 100°C internal temperature. After adding 4.6 g of epichlorohydrin (0.05 mol) the whole is again stirred for 3 hours at 100°C internal temperature. After dilution with 156.6 g of n-butylglycol it is further stirred until cold. A clear product of medium viscosity and of acid number 48 is obtained.

EXAMPLE 24

98 g (0.5 epoxide group equivalent) of the epoxide described in Example 1 together with 31 g (0.1 amino group equivalent) of a mixture of 1-amino-eicosane and 1-amino-docosane and 50 g of n-butylglycol are stirred for 3 hours at 100°C internal temperature. 15.9 g of diethylene glycol (0.3 hydroxyl group equivalent) and 50.5 g of sebacic acid (0.5 acid group equivalent) are then added and the mixture is again stirred for 3 hours at 100°C internal temperature. After adding 4.6 g of epichlorohydrin (0.05 mol) the whole is stirred for a further 3 hours at 100°C internal temperature. After adding 150 g of n-butylglycol it is further stirred until cold. A clear product of medium viscosity and of acid number 47.8 is obtained.

EXAMPLE 25

98 g (0.5 epoxide group equivalent) of the epoxide described in Example 1 together with 31 g (0.1 amino group equivalent) of a mixture of 1-amino-eicosane and 1-amino-docosane and 50 g of n-butylglycol are stirred for 3 hours at 100°C internal temperature. 15.6 g of neopentyl glycol (0.3 hydroxyl group equivalent) and 50.5 g of sebacic acid (0.5 acid group equivalent) are then added and the mixture is again stirred for 3 hours at 100°C internal temperature. After adding 4.6 g of epichlorohydrin (0.05 mol) the whole is again stirred for 3 hours at 100°C internal temperature.

After dilution with 149.7 g of n-butylglycol it is further stirred until cold. A clear product of medium viscosity and of acid number 47.5 is obtained.

a. 177 g of the 50% strength product described (0.075 acid equivalent) together with 31 g of diethylenetriamine (0.96 amino group equivalent) and 12.5 g of butylglycol are stirred for 1 hour at 60°C internal temperature.

After adding 20 g of 24% strength ammonia and 194 g of butylglycol a clear mobile solution of pH value 10.3 is obtained.

b. 177 g of the 50% strength product described (0.075 acid equivalent) together with 40.6 g of tetraethylenepentamine (1.07 amino group equivalent) and 3 g of butylglycol are stirred for 1 hour at 60°C internal temperature.

After adding 50 g of 24% strength ammonia and 163 g of butylglycol a mobile solution of pH value 10.4 is obtained.

c. 236 g of the 50 % strength product described (0.1 acid equivalent) together with 85 g of isophoronediamine (1-amino-3-aminomethyl-3,5,5-trimethyl-cyclohexane) (1-amino group equivalent), 20 g of 24% strength ammonia and 248 g of butylglycol are stirred at room temperature. A mobile solution of pH value 10.8 is obtained.

d. 200 g of the 50% strength product described are mixed with 21 g of 24% strength ammonia and after thorough stirring are diluted with 279 g of butylglycol. A mobile solution of pH value 8.5 is obtained.

e. 177 g of the 50% strength product described are mixed with 44 g of triethanolamine. A product of medium viscosity and of pH value 8.5 is obtained.

f. 234 g of the 50 % strength product described are mixed with 71 g of tri-n-propylamine, 20 g of 24% strength ammonia and 159 g of butylglycol. A mobile solution of pH value 10.0 is obtained.

Example 26

78 g of an epoxide of the following formula

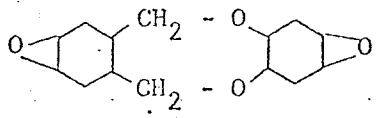

(0.5 epoxide equivalent) together with 31 g (0.1 amino group equivalent) of a mixture of 1-amino-eicosane and 1-amino-docosane and 50 g of butylglycol are stirred for 3 hours at 100°C internal temperature. 17.7 g of 1,6-hexanediol (0.3 hydroxyl group equivalent) and 50.5 g of sebacic acid (0.5 acid group equivalent) are then added and the mixture is again stirred for 3 hours at 100°C internal temperature. Thereafter 4.6 g of epichlorohydrin are added and the whole is again stirred for 3 hours at 100°C internal temperature. It is then diluted with 132 g of butylglycol and further stirred until cold. A clear solution of medium viscosity and of acid number 42.6 is obtained.

EXAMPLE 27

392 g of an epoxide according to Example 1 (2 epoxide equivalents) together with 310 g (1 amino group equivalent) of a mixture of 1-amino-eicosoane and 1-amino-docosane and 200 g of dioxane are stirred for 3 hours at 100°C internal temperature. 70.8 g of 1,6-hexanediol (1.2 hydroxyl group equivalents) and 202 g of sebacic acid (2 acid group equivalents) are then added and the mixture is again stirred for 3 hours at 100°C internal temperature. 37 g of epichlorohydrin (0.4 mol) are then added and the whole is stirred for a further 3 hours at 100°C internal temperature.

Thereafter it is diluted with 812 g of dioxane and further stirred until cold. A solution of medium viscosity and of acid number 81.5 is obtained.

EXAMPLE 28

98 g of an epoxide according to Example 1 (0.5 epoxide equivalent) together with 31 g (0.1 amino group equivalent) of a mixture of 1-amino-eicosane and 1-amino-docosane and 50 g of butylglycol are stirred for 3 hours at 100°C internal temperature. 15.6 g of neopentyl glycol (0.3 hydroxyl group equivalent) and 50.5 g of sebacic acid (0.5 acid group equivalent) are then added and the mixture is again stirred for 3 hours at 100°C internal temperature. 9.25 g of epichlorohydrin (0.1 mol) are then added and the whole is stirred for a further 3 hours at 100°C internal temperature. Thereafter it is diluted with 154 g of trichloroethylene and further stirred until cold. A clear solution of medium viscosity and of acid number 36 is obtained.

100 g of the 50% strength product described and 10 g of a 50% strength solution of an addition product of 70 mols of ethylene oxide to a fatty amine mixture ($C_{16} - C_{22}$) are mixed with rapid stirring and slowly diluted with 140 g of deionised water. A mobile fine-particled emulsion of 20% strength active substance content is obtained.

EXAMPLE 29

98 g of an epoxide according to Example 1 (0.5 epoxide equivalent) together with 31 g (0.1 amino group equivalent) of a mixture of 1-amino-eicosane and 1-amino-docosane and 50 g of butylglycol are stirred for 3 hours at 100°C internal temperature. 17.7 g of 1,6-hexanediol (0.3 hydroxyl group equivalent) and 50.5 g of sebacic acid (0.5 acid group equivalent) are then added and the mixture is again stirred for 3 hours at 100°C internal temperature. 5.8 g of hydroxyethyl acrylate (0.05 mol) are then added and the whole is stirred for a further 3 hours at 100°C internal temperature.

After dilution with 147.6 g of butylglycol it is further stirred until cold. A clear solution of medium viscosity and of acid number 66 is obtained.

EXAMPLE 30

98 g of an epoxide according to Example 1 (0.5 epoxide equivalent) together with 31 g of a mixture of 1-amino-eicosane and 1-amino-docosane (0.1 amino group equivalent) and 55.5 g of butylglycol are stirred for 3 hours at 100°C internal temperature. 17.7 g of 1,6-hexanediol (0.3 hydroxyl group equivalent) and 50.5 g of sebacic acid (0.5 acid group equivalent) are then added and the mixture is again stirred for 3 hours at 100°C internal temperature.

3.6 g of acrylic acid (0.05 mol) are then added and the whole is stirred for a further 3 hours at 100°C internal temperature. After dilution with 145.4 g of butylglycol it is further stirred until cold. A clear solution of medium viscosity and of acid number 71.5 is obtained.

EXAMPLE 31

98 g of an epoxide according to Example 1 (0.5 epoxide equivalent) together with 31 g of a mixture of 1-amino-eicosane and 1-amino-docosane (0.1 amino group equivalent) and 55.5 g of butylglycol are stirred for 3 hours at 100°C internal temperature. 17.7 g of 1,6-hexanediol (0.3 hydroxyl group equivalent) and 50.5 g of sebacic acid (0.5 acid group equivalent) are then added and the mixture is again stirred for 3 hours at 100°C internal temperature. 3.2 g of glycidyl methacrylate (0.025 mol) are then added and the whole is again stirred for 3 hours at 100°C internal temperature. After dilution with 145.4 g of butylglycol it is further stirred until cold. A clear solution of medium viscosity and of acid number 56.9 is obtained.

EXAMPLE 32

98 g of an epoxide according to Example 1 (0.5 epoxide equivalent) together with 31 g of a mixture of 1-amino-eicosane and 1-amino-docosane (0.1 amino group equivalent) and 55.5 g of butylglycol are stirred for 3 hours at 100°C internal temperature. 17.7 g of 1,6-hexanediol and 50.5 g of sebacic acid are then added and the mixture is again stirred for 3 hours at 100°C internal temperature. Thereafter 5.1 g of methylolacrylamide (0.05 mol) are added and the whole is stirred for a further 3 hours at 100°C internal temperature. After addition of 146.9 g of butylglycol it is further stirred until cold.

A clear mobile solution of acid number 59 is obtained.

EXAMPLE 33

98 g of an epoxide according to Example 1 (0.5 epoxide equivalent) together with 54.2 g of a mixture of 1-amino-eicosane and 1-amino-docosane (0.175 amino group equivalent) and 60.6 g of sebacic acid (0.6 acid group equivalent) are stirred for 2 hours at 100°C internal temperature.

66.3 g of hexamethylolmelamine hexamethyl ether are then added and the mixture is again stirred for 1 hour at 100°C internal temperature. Thereafter it is diluted with 279 g of butylglycol and further stirred until cold. A product of medium viscosity and of acid number 61 is obtained.

EXAMPLE 34

98 g of an epoxide according to Example 1 (0.5 epoxide equivalent) together with 54.2 g of a mixture of 1-amino-eicosane and 1-amino-docosane (0.175 amino group equivalent) and 60.6 g of sebacic acid (0.6 acid group equivalent) are stirred for 2 hours at 100°C internal temperature. 57.5 g of hexamethylolmelamine pentamethyl ether are then added and the mixture is again stirred for 1 hour at 100°C internal temperature. It is then diluted with 264 g of butylglycol and further stirred until cold. A product of medium viscosity and of acid number 64.5 is obtained.

EXAMPLE 35

98 g of an epoxide according to Instruction 1 (0.5 epoxide equivalent) together with 54.2 g of a mixture of 1-amino-eicosane and 1-amino-docosane (0.175 amino group equivalent), 60.6 g of sebacic acid (0.6 acid group equivalent) and 50 g of butylglycol are stirred for 2 hours at 100°C internal temperature 62.3 g of the methyl ether of dihydroxydimethylolethyleneurea are then added and the mixture is again stirred for 1 hour at 100°C internal temperature. Thereafter it is diluted with 225 g of butylglycol and further stirred until cold. A product of medium viscosity and of acid number 69.6 is obtained.

EXAMPLE 36

49.4 g of a polyamide from polymerised linoleic acid and diethylenetriamine (0.2 amino group equivalent) are dissolved in 50 g of butylglycol and the solution is warmed to 53°C internal temperature. A solution of 18.95 g of the epoxide described below (0.05 epoxide group equivalent) in 20 g of n-butylglycol is then run in dropwise over the course of 30 minutes. One hour thereafter, a solution of 8 g of glacial acetic acid and 195 g of deionised water is added and the mixture is stirred until cold. A mobile solution of 20% solids content and pH value 7.0 is obtained.

196 g (1 epoxide group equivalent) of the epoxide described in Example 1 together with 77.5 g (0.25 amino group equivalent) of the fatty amine described in Example 1 are stirred for 1 hour at 100°C. A highly viscous product of epoxide group equivalent weight 379 is obtained.

EXAMPLE 37

49.4 g (0.2 amino group equivalent) of the polymer from Example 36 are dissolved in 50 g of n-butylglycol and the solution is warmed to 58°C internal temperature. A solution of 34.25 g of the epoxide described below (0.05 epoxide group equivalent) and 35 g of n-butylglycol is then run in dropwise over the course of 40 minutes. One hour thereafter, a solution of 7 g of glacial acetic acid and 226 g of deionised water is added and the mixture is stirred until cold. A mobile solution of 20% solids content and pH value 7.0 is obtained.

196 g (1 epoxide group equivalent) of the epoxide described in Example 1 together with 155 g (0.5 amino group equivalent) of the fatty amine described in Example 1 are stirred for 1 hour at 100°C. A highly viscous product having an epoxide group equivalent weight of 685 is obtained.

EXAMPLE 38

61.8 g of a polyamide of polymerised linoleic acid and diethylenetriamine (0.25 amino group equivalent) are dissolved in 61.8 g of isopropanol and the solution is warmed to 53°C internal temperature. A solution of 12.85 g of the epoxide described below (0.05 epoxide group equivalent) in 12.85 g of isopropanol is then added over the course of 30 minutes. One hour thereafter, a solution of 15 g of glacial acetic acid in 200 g of deionised water is added and the mixture is further stirred until cold. A mobile solution of 20% solids content and pH value 6.0 is obtained.

91.2 g of butanediol diglycidyl ether (0.8 epoxide group equivalent) together with 62 g (0.2 amino group equivalent) of a mixture of 1-amino-eicosane and 1-amino-docosane are stirred for 1 hour at 100°C. A clear viscous product having an epoxide group equivalent weight of 257 is obtained.

EXAMPLE 39

49.4 g (0.2 amino group equivalent) of the polyamide according to Example 38 are dissolved in 49.4 g of ethanol and the solution is warmed to 53°C internal temperature. A solution of 19.8 g of the epoxide described below (0.05 epoxide group equivalent) in 19.8 g of ethanol is then added dropwise over the course of 30 minutes. Thereafter, 24 g of glacial acetic acid in 180 g of deionised water are added and the mixture is further stirred until cold. A clear mobile solution of 20% solids content and pH value 5.9 is obtained.

99 g of hexahydrophthalic acid diglycidyl ester (0.6 epoxide group equivalent) together with 46.5 g (0.15 amino group equivalent) of a mixture of 1-amino-eicosane and 1-amino-docosane are stirred for one hour at 100°C. A clear viscous product having an epoxide equivalent weight of 395 is obtained.

EXAMPLE 40

49.4 g (0.2 amino group equivalent) of the polyamide according to Example 38 are dissolved in 49.4 g of butylglycol and the solution is warmed to 54°C internal temperature. A solution of 20 g of the epoxide described below (0.05 epoxide group equivalent) in 20 g of butylglycol is then added dropwise over the course of 30 minutes. One hour thereafter, 12 g of glacial acetic acid in 190 g of deionised water are added and the mixture is further stirred until cold. A clear mobile solution of 20% solids content and of pH value 5.4 is obtained.

98 g of an epoxide formed from 2,2-bis-(4'-hydroxyphenyl)-propane and epichlorohydrin (0.5 epoxide group equivalent) together with 33.7 g of stearylamine (0.125 amino group equivalent) are stirred for 1 hour at 100°C. A clear viscous product having an epoxide group equivalent of 400 is obtained.

EXAMPLE 41

49.4 g (0.2 amino group equivalent) of the polyamide according to Example 38 are dissolved in 49.4 g of dioxane and the solution is warmed to 55°C internal temperature. A solution of 13.9 g of the epoxide described below (0.05 epoxide group equivalent) in 13.9 g of dioxane is then added dropwise over the course of 30 minutes.

One hour thereafter, 12 g of glacial acetic acid in 172 g of deionised water are then added and the mixture is further stirred until cold. A mobile solution of 20% solids content and pH value 5.4 is obtained.

96 g of an epoxide of the formula

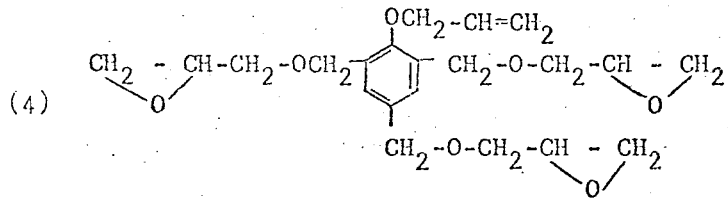

(4)

(0.6 epoxide group equivalent) together with 46.5 g (0.15 amino group equivalent) of a mixture of 1-amino-eicosane and 1-amino-docosane are stirred for 1 hour at 100°C. A clear viscous product having an epoxide group equivalent weight of 278 is obtained.

EXAMPLE 42

79 g (0.32 amino group equivalent) of the polyamide according to Example 38 are dissolved in 79 g of butylglycol and the solution is warmed to 55°C internal temperature. A solution of 16.6 g of the epoxide described below (0.08 epoxide group equivalent) and 16.6 g of butylglycol is then added dropwise over the course of 30 minutes. 40 minutes thereafter, 19.2 g of glacial acetic acid and 260 g of deionised water are added and the mixture is further stirred until cold. A mobile solution of 20% solids content and pH value 5.6 is obtained.

99.6 g of triglycidylisocyanurate (0.6 epoxide group equivalent) together with 46.5 g (0.15 amino group equivalent) of a mixture of 1-amino-eicosane and 1-amino-docosane are stirred for 1 hour at 100°C. A clear product having an epoxide group equivalent weight of 208 is obtained.

EXAMPLE 43 a. 187 g of polymerised fatty acid and 68.5 g of diethylenetriamine are introduced into a reaction vessel which is equipped with a stirrer, thermometer, nitrogen inlet tube and distillation head. The polymerised fatty acid, obtained by polymerisation of oleic acid, has the following properties: 95% of dimerised oleic acid; equivalent weight: 289.

The reaction mixture is heated to 200°C over the course of 1½ hours under a nitrogen atmosphere and whilst stirring, the splitting off of water starting at 160°C internal temperature. After a further 2 hours at 200°C, a total of 13 parts of water are collected. Thereafter the mixture is concentrated for 3 hours in vacuo (14 mm Hg) at 200° to 210°C. 210 g of a viscous yellowish clear product having an amine equivalent weight of 372 are obtained.

b. 74.4 g of the condensation product described under a) (0.2 amino group equivalent) are dissolved in 74.4 g of butylglycol and the solution is warmed to 55°C internal temperature. A solution of 20.2 g of the epoxide described below (0.05 epoxide group equivalent) and 20.2 g of butylglycol is then added dropwise over the course of 30 minutes. 30 minutes thereafter 12 g of glacial acetic acid and 265 g of deionised water are added and the mixture is further stirred until cold. A clear, mobile solution of 20% solids content and pH value 6.0 is obtained.

156.8 g of an epoxide formed from 2,2-bis-(4'-hydroxyphenyl)-propane and epichlorohydrin (0.8 epoxide group equivalent) together with 37.1 g of laurylamine (0.2 amino group equivalent) are stirred for 1 hour at 100°C. A clear product having an epoxide group equivalent weight of 403 is obtained.

EXAMPLE 44

44.6 g of the condensation product described under 43 a) (0.12 amino group equivalent) are dissolved in 44.6 g of butylglycol and the solution is warmed to 60°C internal temperature. 7.2 g of glacial acetic acid, and a solution of 44.4 g of the epoxide described below (0.02 epoxide group equivalent) and 44.4 g of butylglycol are then added dropwise from 2 separate dropping funnels over the course of 30 minutes. Thereafter the mixture is stirred for a further 6½ hours at 60°C internal temperature and 10 g of glacial acetic acid are then again added. After a further 30 minutes, the whole is diluted with 180 g of butylglycol. A clear mobile solution of 20% solids content is obtained.

A sample, diluted 1:20 with water, shows a pH value of 5.8.

98 g of an epoxide formed from 2,2-bis-(4'-hydroxyphenyl)-propane and epichlorohydrin (0.5 epoxide group equivalent) are warmed to 85 – 90°C internal temperature. 124 g (0.4 amino group equivalent) of a mixture of 1-amino-eicosane and 1-amino-docosane are then added over the course of 15 minutes. Thereafter the mixture is stirred for a further 6 hours at 100°C internal temperature. A highly viscous product having an epoxide group equivalent weight of 2,220 is obtained.

EXAMPLE 45

66.6 g of the epoxide described in Example 44 (0.03 epoxide group equivalent) are dissolved in 66.6 g of butylglycol and the solution is warmed to 60°C internal temperature. 5.6 g of glacial acetic acid and a solution of 33.4 g of the condensation product described under 43 a) (0.09 amino group equivalent) and 33.4 g of butylglycol are then added dropwise from 2 separate dropping funnels over the course of 30 minutes.

Thereafter the mixture is stirred for a further 6½ hours at 60°C internal temperature and 10 g of glacial acetic acid are then again added. After a further 30 minutes, the whole is diluted with 283 g of butylglycol. A clear, mobile solution of 20% solids content is obtained. A sample, diluted 1:20 with water, shows a pH value of 5.8.

EXAMPLE 46

68.5 g of the epoxide according to Example 37 (0.1 epoxide group equivalent) are dissolved in 37 g of isopropanol and the solution is warmed to 88°C internal temperature. A solution of 24.7 g (0.1 amino group equivalent) of the polyamide according to Example 38 and 15 g of isopropanol is then added dropwise over the course of 30 minutes.

Thereafter the mixture is stirred for a further 5 hours at approx. 88°C internal temperature (reflux) and 1.85 g of epichlorohydrin (0.02 mol) are then added. After a further 10 minutes, a solution of 16 g of glacial acetic acid and 312 g of deionised water is added and the mixture is further stirred until cold. A mobile product of 20% solids content and pH value 4.6 is obtained.

EXAMPLE 47

79 g (0.32 amino group equivalent) of the polyamide according to Example 38 are dissolved in 40 g of butylglycol and the solution is warmed to 80°C internal temperature. A solution of 30.4 g of the epoxide described below (0.08 epoxide group equivalent) and 30.4 g of butylglycol is then added dropwise over the course of 30 minutes.

15 minutes thereafter, 20 g of glacial acetic acid and 336 g of deionised water are added and the mixture is further stirred until cold. A mobile solution of 20% solids content and pH value 5.3 is obtained.

196 g of an epoxide formed from 2,2-bis-(4'-hydroxyphenyl)-propane and epichlorohydrin (1 epoxide group equivalent) together with 32 g of laurylpropylenediamine (0.2 amine equivalent) are stirred for 1 hour at 100°C. A clear product having an epoxide group equivalent weight of 380 is obtained.

EXAMPLE 48

79 g (0.32 amino group equivalent) of the polyamide according to Example 38 are dissolved in 40 g of butylglycol and the solution is warmed to 80°C internal temperature. A solution ob 22.6 g of the epoxide described below and 22.6 g of butylglycol is then added dropwise over the course of 30 minutes.

15 minutes thereafter, 20 g of glacial acetic acid and 311 g of deionised water are added and the mixture is further stirred until cold. A mobile solution of 20% solids content and pH value 5.2 is obtained.

196 g of an epoxide formed from 2,2-bis-(4'-hydroxyphenyl)-propane and epichlorohydrin (1 epoxide group equivalent) together with 20.4 g of tall oil-propylenediamine (0.1 amine equivalent) are stirred for 1 hour at 100°C. A clear product having an epoxide group equivalent weight of 282 is obtained.

EXAMPLE 49

79 g (0.32 amino group equivalent) of the polyamide according to Example 38 are warmed to 180°C internal temperature. 16.7 g of dodecene oxide (0.08 mol) are added dropwise over the course of 2 hours, the mixture is kept at 180°C for a further 2 hours and is then cooled to 50°C internal temperature, and the product is dissolved in 32 g of butylglycol. A solution of 20.4 g of the epoxide described below (0.08 epoxide group equivalent) and 20.4 g of butylglycol is then added dropwise over the course of 30 minutes at 50°C internal temperature. Thereafter the internal temperature is raised to 60°C and the mixture is stirred for a further 1¼ hours at this temperature. 20 g of glacial acetic acid and 391 g of deionised water are then added and the mixture is further stirred until cold. A mobile solution of 20% solids content and pH value 4.9 is obtained.

196 g (1 epoxide group equivalent) of an epoxide formed form 2,2-bis-(4'-hydroxyphenyl)-propane and epichlorohydrin, together with 31 g (0.1 amino group equivalent) of a mixture of 1-amino-eicosane and 1-amino-docosane are stirred for 1 hour at 100°C. A clear, viscous product having an epoxide group equivalent weight of 255 is obtained.

EXAMPLE 50

79 g (0.32 amino group equivalent) of the polyamide according to Example 38 together with 10.1 g of benzyl chloride (0.08 mol) are stirred for 2 hours at 100°C internal temperature. The product is then cooled to 60°C internal temperature and 32 g of butylglycol are added. A solution of 20.4 g of the epoxide described in Example 49 (0.08 epoxide group equivalent) and 20.4 g of butylglycol is then added dropwise over the course of 30 minutes at this temperature. 25 minutes thereafter, 20 g of glacial acetic acid and 364 g of deionised water are added and the mixture is further stirred until cold. A mobile solution of 20% solids content and pH value 4.6 is obtained.

EXAMPLE 51

79 g (0.32 amino group equivalent) of the polyamide according to Example 38 are dissolved in 32 g of butylglycol and the solution is warmed to 50°C internal temperature. 4.3 g of acrylonitrile (0.08 mol) are then added and the mixture is stirred for 2 hours at 50°C internal temperature. A solution of 20.4 g of the epoxide described in Example 49 (0.08 epoxide group equivalent) and 20.4 g of butylglycol is then added dropwise over the course of 30 minutes. 1½ hours thereafter, 20 g of glacial acetic acid and 339 g of deionised water are added and the mixture is further stirred until cold. A mobile solution of 20% solids content and pH value 5.0 is obtained.

b. Instead of the after-treatment described, it is also possible to introduce 2,000 g of a 20% strength aqueous emulsion of the following composition directly into the treatment bath or to apply it in an after-treatment. The yarn shows a very good non-felting effect.

Manufacture of the Emulsion 315.76 g of deionised water, 12.3 g of glacial acetic acid, 6.1 g of a condensation product of 1 mol of octadecyl alcohol and 35 mols of ethylene oxide and 0.1 g of anti-foaming agent are warmed to 95°C internal temperature in a stirred flask which can be heated. Thereafter a solution of 74.2 g of polyethylene (containing carboxyl groups introduced by oxidation), 22.8 g of paraffin (melting point: 60° to 62°C), 17.1 g of a condensation product of dimerised unsaturated fatty acids and diethylenetriamine and 152 g of butylglycol is added with rapid stirring. The temperature of the solution is about 110°C.

Thereafter, the resulting emulsion is slowly cooled.

Silicone oil can subsequently be emulsified in this

| | Composition of the alkylamine | Alkylene oxide, mol | Alkylene oxide adduct, parts (1 mol) | Urea, parts | Amido-sulphonic acid, parts | Water parts |
|---|---|---|---|---|---|---|
| 1 | 30% of hexadecylamine 25% of octadecylamine 45% of octadecenylamine | 7 | 580 | 107 | 214 | 650 |
| 2 | do. | 7 | 580 | 200 | 320 | 450 |
| 3 | do. | 7 | 580 | 214 | 214 | 540 |
| 4 | do. | 10.5 | 773 | 107 | 214 | 840 |
| 5 | do. | 16 | 1010 | 200 | 320 | 880 |
| 6 | do. | 16 | 1010 | 214 | 214 | 970 |
| 7 | 10% of stearylamine 55% of arachidylamine 25% of behenylamine | 30 | 1620 | 200 | 320 | 1450 |

USE EXAMPLES

EXAMPLE 53 a. 100 kg of wool yarn are first dyed in a hank dyeing apparatus with a reactive dyestuff, in the usual manner. Thereafter the yarn is rinsed and a fresh treatment bath of 3,000 l of water (about 15° German hardness) at a temperature of 30°C is prepared. The following are added to this treatment bath: 150 g of sodium bicarbonate, 1,000 g of a 50% strength aqueous solution of the reaction product 5 according to Example 52, 8,000 g of the aqueous preparation according to Example 36 (cationic agent for imparting non-felting properties) and 5,000 g of ammonia (25% strength), these being added over the course of 30 minutes.

An emulsion is formed in the treatment liquor and is completely absorbed on the wool over the course of 40 minutes.

Thereafter, 15,000 g of hydrogen peroxide (33% strength) and 2,000 g of a 20% strength aqueous emulsion of polyethylene are added, the polyethylene containing carboxyl groups introduced by oxidation.

After a further treatment time of 20 minutes, the yarn is rinsed and dried. The yarn shows a non-felting effect according to IWS Specification 71. Without the addition of the reaction product 5 according to Example 52, the agent for imparting non-felting properties is not absorbed on the wool. Similarly good results are also achieved with the reaction products 1 to 4 and 7 according to Example 52 (component 2), and with the reaction products of Examples 37 to 51 (component 1).

emulsion, it being possible to use about 5 to 15%, relative to the solids content of the emulsion.

EXAMPLE 54

100 kg of dyed yarn in hank form are packed into a hank dyeing apparatus and wetted in 4,000 l of water at 30°C. The following are added to this treatment bath: 1,500 g of acetic acid (80% strength), 16,000 g of the aqueous preparation according to Example 28 (water-insoluble emulsified anionic agent for imparting non-felting properties), 2,000 g of the aqueous preparation 6 according to Example 52, 500 g of a 20% strength aqueous polyethylene emulsion and 3,500 g of glacial acetic acid (80% strength), which are added over the course of 30 minutes.

Calculated from the start of the addition of the acid, the resin is completely absorbed on the wool fibres within 40 minutes. Thereafter, 1,000 g of sodium bisulphite and 3,000 g of a 20% strength aqueous emulsion of polyethylene are added, the polyethylene containing carboxyl groups introduced by oxidation. After a further 30 minutes treatment time, the liquor is run off, and the yarn is drained and dried at 80°C. The yarn has a non-felting finish according to IWS Specification 71. Similarly good results are also obtained with reaction product 3 according to Example 52.

Without the addition of the reaction products according to Example 52, the emulsified agent for imparting non-felting properties is not absorbed on the fibre even if softened water is used in the liquor. As a modification of the application described above, the amount of acid can also be added all at once whilst the reaction product 6 according to Example 52 is introduced into the liquor over the course of 30 minutes.

EXAMPLE 55

100 kg of wool yarn are dyed in the usual manner in a package-dyeing apparatus, using a reactive wool dyestuff. The yarn is then rinsed and a new treatment bath of 2,000 l of water at a temperature of 30°C is prepared. The following are added to this treatment bath: 1,500 g of glacial acetic acid (80% strength), 8,000 g of the aqueous preparation according to Example 11 (water-soluble anionic agent for imparting non-felting properties), 500 g of the aqueous preparation 1 according to Example 52, 500 g of a 20% strength aqueous polyethylene emulsion and 3,500 g of glacial acetic acid (80% strength), which are added over the course of 30 minutes.

On running in the acetic acid, a stable emulsion is formed in the treatment bath and is completely absorbed on the wool over the course of 40 minutes, calculated from the start of the addition of acid. Thereafter, 1,000 g of sodium metabisulphite and 3,000 g of a 20% strength aqueous emulsion of polyethylene are added, the polyethylene containing carboxyl groups introduced by oxidation. After a further 20 minutes, the bath is run out and the wool is drained and dried at 80°C. The yarn has a non-felting finish according to IWS Specification 71. Without the addition of the aqueous preparation 1 according to Example 52, the agent for imparting non-felting properties would not be absorbed from hard water onto the substrate.

Good results are also obtained with the reaction products 3 and 5 to 7 according to Example 52 (component 2), and the reaction products of Examples 1 to 10 and 12 to 35 (component 1).

What is claimed is:

1. An agent for rendering wool non-felting, said agent being water soluble or water dispersible and containing
    1. a reaction product of a) an epoxide which contains at least two epoxide groups per molecule with
    b. a fatty amine of 12 to 22 carbon atoms and $c_1$) a dicarboxylic acid of 7 to 14 carbon atoms wherein the epoxide-amine-carboxyl group ratios are 1:(0.1–0.5):(1–0.55) and the reaction temperature is 80° to 120°C; and
    2) an adduct of a fatty amine of 12 to 22 carbon atoms with 6 to 30 moles of ethylene oxide, esterified with a dibasic or tribasic oxygen-containing acid.

2. An agent of claim 1 which comprises as component 1) the reaction product of
    a. about 0.5 epoxide equivalent of an epoxide formed from 2,2-bis-(4-hydroxyphenyl)propane and epichlorohydrin,
    b. about 0.1 amino group equivalent of 1-amino-eicosane and 1-amino-docosane,
    c. about 0.5 acid group equivalent of sebacic acid, with
    e. about 0.3 hydroxyl group equivalent of neopentylglycol and
    f. about 0.1 mol of epichlorohydrin.

3. An agent of claim 1, wherein component 1) is further reacted with $c_2$) an anhydride of an aromatic dicarboxylic acid with at least 8 carbon atoms or an anhydride of an aliphatic monocarboxylic or dicarboxylic acid with at least 4 carbon atoms.

4. An agent of claim 1, wherein component 1) is further reacted with one or more of the following components: d) an aminoplast precondensate containing alkyl-ether groups, e) an aliphatic diol with 2 22 carbon atoms, f) a difunctional, organic compound which contains, as functional groups or atoms, one or two members of the group consisting of mobile halogen, vinyl or ester groups and/or no more than one member of the group consisting of carboxylic acid, nitrile, hydroxyl or epoxide groups, and g) ammonia or a water-soluble organic base.

5. An agent of claim 1, wherein component 1) is further reacted with one or more of the following components: d) an aminoplast precondensate containing alkyl-ether groups, e) an aliphatic diol with 2 to 22 carbon atoms, f) a difunctional, organic compound which contains, as functional groups or atoms, one or two members of the group consisting of mobile halogen, vinyl or ester groups and/or no more than one member of the group consisting of carboxylic acid, nitrile, hydroxyl or epoxide groups, and g) ammonia or a water-soluble organic base.

6. The agent of claim 1, wherein the acid of component 2) is sulfuric acid or amidosulfonic acid.

7. The agent of claim 6, wherein component 2) is an adduct of a fatty amine of 16 to 18 carbon atoms with 7 to 16 moles of ethylene oxide.

8. An agent of claim 1, wherein there is additionally contained an agent for imparting a soft handle.

9. The agent of claim 8, wherein the agent for imparting a soft handle is selected from the group consisting of oil, fat emulsion, wax emulsion, fatty acid condensation products, polyethylene emulsion, siloxane emulsion and silicone emulsion.

10. The agent of claim 9, wherein the agent for imparting a soft handle is a mixture of 50 to 80 parts by weight of a carboxy-polyethylene and 20 to 50 parts by weight of a condensation product of a dimerised fatty acid and diethylene triamine.

* * * * *

UNITED STATES PATENT OFFICE
CERTIFICATE OF CORRECTION

Patent No. 3,860,540        Dated January 14, 1975

Inventor(s)    HEINZ ABEL ET AL

It is certified that error appears in the above-identified patent and that said Letters Patent are hereby corrected as shown below:

In column 28, line 16, claim 4, change "2 22" to -- 2 to 22 --.

Signed and sealed this 1st day of April 1975.

(SEAL)
Attest:

RUTH C. MASON
Attesting Officer

C. MARSHALL DANN
Commissioner of Patents
and Trademarks